United States Patent [19]

Konishi

[11] Patent Number: 4,974,896
[45] Date of Patent: Dec. 4, 1990

[54] AUXILIARY VISOR

[75] Inventor: Masaaki Konishi, Yokohama, Japan

[73] Assignee: Nissan Motor Co., Ltd., Yokohama, Japan

[21] Appl. No.: 398,571

[22] Filed: Aug. 25, 1989

[30] Foreign Application Priority Data

Aug. 26, 1988 [JP] Japan .................................. 63-212716

[51] Int. Cl.⁵ .............................................. B60J 3/02
[52] U.S. Cl. .................................... 296/97.6; 296/97.7
[58] Field of Search ................... 296/97.6, 97.1, 97.9, 296/97.7

[56] References Cited

U.S. PATENT DOCUMENTS 2,485,440 10/1949 Friedheim ........................... 296/97.6
2,620,222 12/1952 Beauchamp ........................ 296/97.6
2,970,864 2/1961 McCann, Jr. ........................ 296/97.6
4,195,876 4/1980 Timperio ............................. 296/97.6
4,363,512 12/1982 Marcus ................................ 296/97.6

Primary Examiner—Robert R. Song
Attorney, Agent, or Firm—Pennie & Edmonds

[57] ABSTRACT

A mounting shaft is fixedly installed in the upper end of a shield and has an axially central portion projection from the shield. A mounting bracket is installed on a stay of a rear view mirror which is in turn installed on a front roof rail of a vehicle. The mounting shaft has a gripping portion in the form of a tube of a part-circular cross section for supporting the central portion of the mounting shaft. A device is provided to the mounting shaft and the mounting bracket for holding the mounting shaft yieldingly fixed in a predetermined angular position relative to the mounting bracket.

8 Claims, 4 Drawing Sheets

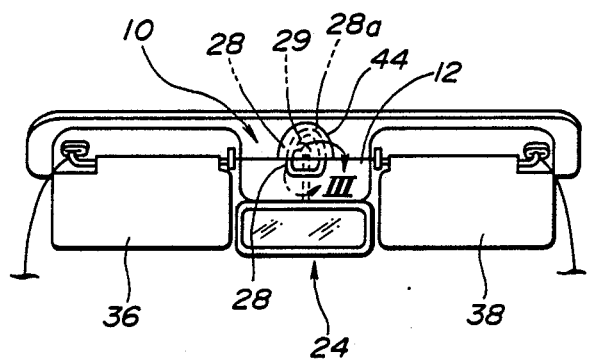
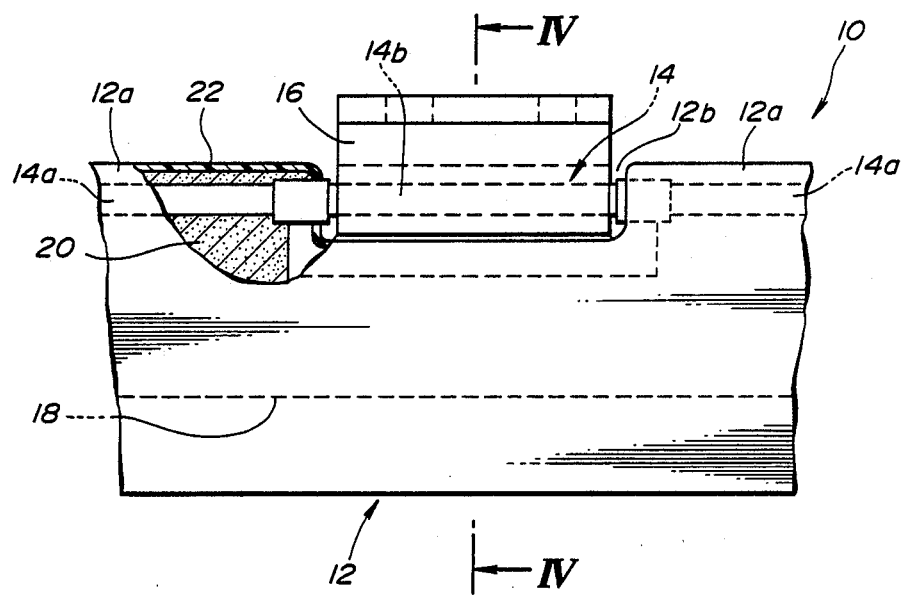

AUXILIARY VISOR

BACKGROUND OF THE INVENTION

1. Field of the Invention

The present invention relates to an auxiliary visor for an automotive vehicle.

2. Description of the Prior Art

It is known to install an auxiliary visor on a rearview mirror placed between standard sun visors as disclosed by Japanese Utility Model Provisional Publication No. 57-131321.

It is also known to slidably install on a vehicle body an auxiliary visor for selectively filling in the gap above and behind a rear view mirror which is not covered by usual sun visors as disclosed by U.S. Pat. No. 4,275,917.

A problem of the auxiliary visor disclosed by the above Japanese Utility Model Publication is that the visor is arranged so as to be always standing errect above the rearview mirror and therefore tends to make a driver or passenger of a vehicle feel depressed, gloomy or uncomfortable though it can effectively shield the unprotected area between the usual sun visors.

A problem of the auxiliary visor disclosed by the above U.S. Patent is that such a visor cannot be used in case the rearview mirror is installed on a front roof rail, ceiling member or the like roof member of a vehicle by means of a stay, i.e., the visor can be used only when the rearview mirror is adapted for installation on a windshield glass.

To solve the similar problems, the applicant of this application had previously proposed an improved auxiliary visor as disclosed in U.S. patent application No. 07/330518 filed Mar. 30, 1989.

SUMMARY OF THE INVENTION

In accordance with the present invention, there is provided a novel auxiliary visor for a vehicle having a pair of sun visors and a rear view mirror disposed between the sun visors.

The auxiliary visor comprises a shield disposed between the sun visors, a mounting shaft fixedly installed on the shield and having an exposed portion on the mounting shaft mounting bracket is installed on a mounting stay of the rear view mirror and the mounting bracket has a gripping portion in the form a part-circular cross section for supporting the exposed portion of the mounting shaft. The auxiliary visor further comprises means for holding the mounting shaft yieldingly fixed in a predetermined angular position relative to the mounting bracket.

The above structure is effective for solving the above noted problems inherent in the prior art auxiliary visors.

It is accordingly an object of the present invention to provide an auxiliary visor which does not make a driver or passenger of a vehicle feel depressed, gloomy or uncomfortable without deteriorating its function.

It is a further object of the present invention to provide an auxiliary visor of the above described character which can be used not only in case a rear view mirror is installed on a windshield glass but in case a rear view mirror is installed on a roof member as a front roof rail, ceiling member, etc. of a vehicle.

BRIEF DESCRIPTION OF THE DRAWINGS

FIG. 2 is an elevational view of the auxiliary visor of FIG. 1, together with the associated rear view mirror, standard sun visors, etc.;

FIG. 3 is an enlarged view of a portion III of FIG. 2;

DESCRIPTION OF THE PREFERRED EMBODIMENTS

Figure 1:
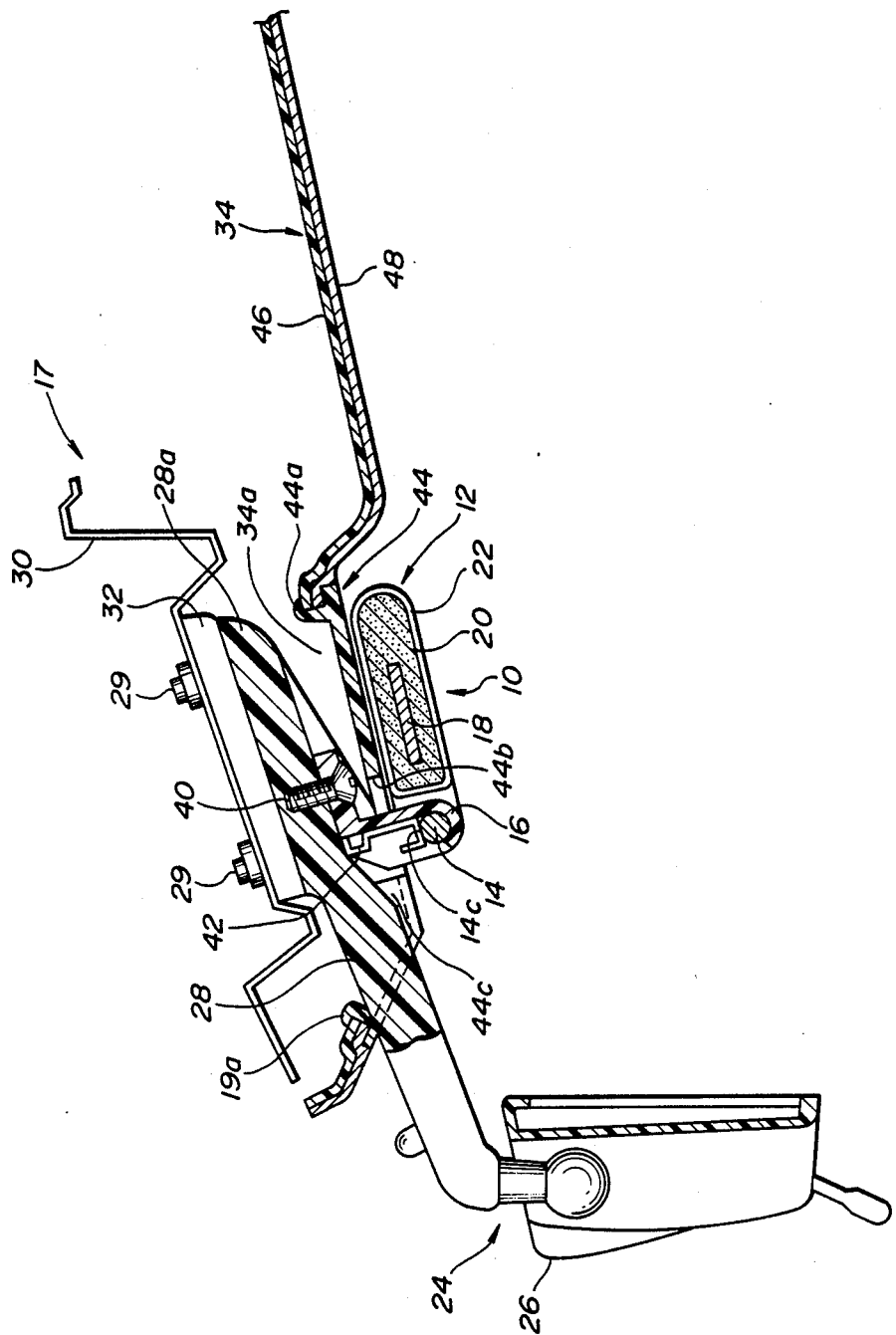
FIG. 1 is a sectional view of an auxiliary visor according to an embodiment of the present invention, together with an associated rear view mirror and vehicle body portion.
Figure 4:
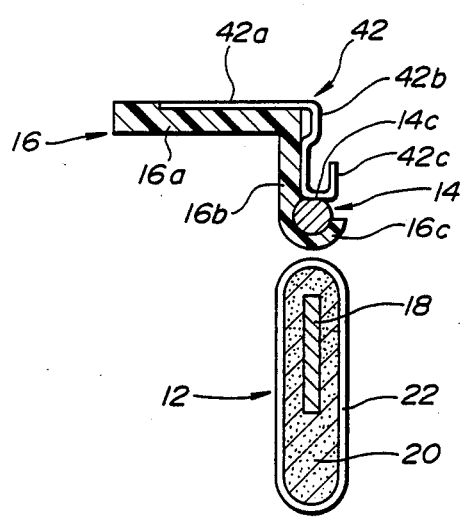
FIG. 4 is a sectional view taken along the line IV—IV of FIG. 3.

Referring to FIGS. 1–4, an auxiliary visor 10 according to an embodiment of the present invention includes a shield 12, a mounting shaft 14 and a mounting bracket 16.

The shield 12 is generally rectangular but is recessed in such a way as to have a recess 12b between opposite upper end portions 12a. The shield 12 is elongated laterally of a vehicle body 17 on which the auxiliary visor 10 is installed. The o shield 12 includes a core member 18 in the form of a flat plate, a cushion member 20 in which the core member 18 is embedded and a cover member 22 formed of polyvinyle chrolide or the like material and covering the cushion member 20.

A rear view mirror 24 consists of a mirror main body 26 and a stay 28. The stay 28 has an anchor portion 28a at which it is attached with screws 29 to a front roof rail 30 of the vehicle body 17 by way of a packing 32.

The shield 12 is placed between the mirror main body 26 and a ceiling member 34 of the vehicle body 17 and also between standard or usual sun visors 36, 38.

The mounting shaft 14 has opposite end portions 14a fixedly installed in the respective upper end portions 12a of the shield 12 and a central portion 14b extending through the recess 12b. The mounting bracket 16 is of an L-like cross section and has a first arm 16a attached with screws 40 to the anchor portion 28a of the stay 28 and a second arm 16b extending away from the first arm 16a to have at a free end thereof a gripping portion 16c in the form of a tube of a part-circular cross section. The gripping portion 16c is received in the recess 12b of the shield 12 and rotatably supports the central portion 14b of the mounting shaft 14.

A leaf spring 42 is of an L-like cross section and has a first arm 42a and a second arm 42b extending away from the first arm 42a to have at a free end thereof a bent end portion 42c of a U-like cross section. The first arm 42a extends along the first arm 16a of the mounting bracket 16 and is fixedly held between the first arm 16a of the mounting bracket 16 and the anchor portion 28a of the stay 28. The second arm 42b extends along the second arm 16b of the mounting bracket 16 and projects into the gripping portion 16c in such a way that the mounting shaft 14 is held yieldingly fixed in a predetermined angular position relative to the mounting bracket 16. The mounting shaft is clamped between the gripping portion 16c and the bent end portion 42c under the bias of the spring 42. To attain this end assuredly, the mounting shaft 14 which is generally of a circular cross section is formed with a flat surface portion 14c for surface-to-surface contact with the bent end portion 42c of spring 42.

The ceiling member 34 has an access hole 34a for installation of the stay 28 of the rear view mirror 24 to the front roof rail 30. A closure 44 made of a synthetic resinous material is fitted in the hole 34a to close the same while allowing the mounting bracket 16 and the stay 28 of the rear view mirror 24 to extend therethrough. To this end, the closure 44 has a peripheral gripping portion 44a of a channel-shaped cross section and adapted to firmly grip the edge of the ceiling member 34 defining the access hole 34a when installed in place. The closure 44 further has an opening 44b and a recess 44c through which the stay 28 and the mounting bracket 16 extend.

The ceiling member 34 consists of a base member 46 made of a synthetic resinous material and a cover member 48 made of polyvinyle chrolide and covering the inboard surface of the base member 46. The ceiling member 34 is stepped or bent at the portion formed with the access hole 34a so that the inboard surface of the closure 44 can be flash with the adjacent inboard surface of the ceiling member 34.

The shield 12 is thus rotatable about the mounting shaft 14 to perform an efficient shielding action.

The mounting shaft 14 is held yieldingly fixed in a predetermined angular position for holding the shield 12 in the position for storange, i.e., in the position where the shield 12 lies along the ceiling member 34, by the effect of engagement of the flat surface portion 14c of the mounting shaft 14 with the bent end portion 42c of the leaf spring 42. When the shield 12 is driven to rotate with a force larger than a predetermined value against the bias of the leaf spring 42, the spring 42 once resiliently deforms or flexes to allow the mounting shaft 14 to rotate out of the above described predetermined angular position. In this connection, the gripping portion 16c of the mounting bracket 16 is shaped such that the mounting shaft 14 is removable from the mounting bracket 16 when the spring 42 flexes more than a predetermined amount.

With the foregoing structure, the shield 12 is rotatable into the position where it lies along the ceiling member 34 and held yieldingly fixed in that position, whereby the windshield is unobstructed between the standard sun visors 36, 38 and above the rear view mirror 24. Accordingly, it becomes possible to prevent the auxiliary visor 10 from making the driver or passenger feel depressed, gloomy or uncomfortable. When the shield 12 is rotated into the position where it fills in the gap above the rear view mirror 24 which is not covered by the standard sun visors 36, 38, it can effectively shield the eyes of the driver or passenger from direct sunlight or glare. Further, the shield 12 is removable from the mounting bracket 16 through reisilient deformation of the spring 42, thus making it possible to perform intallation and removal of the rear view mirror 24 with ease.

Figure 5:
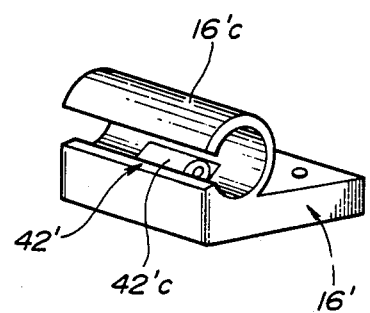
FIG. 5 is a variant of a mounting bracket and a spring for use in the auxiliary visor of FIG. 1.

In the above described embodiment, the bent end portion 42c of spring 42 has been described and shown as to project into the gripping portion 16c of the mounting bracket 16 through an opening formed by the discontinuous wall of the gripping portion 16c. FIG. 5 shows a mounting bracket 16' and spring 42' according to a variant of this invention. In this variant, the opening formed by the discontinuous wall of the gripping portion 16'c is made smaller and the bent end portion 42'c of the spring 42' is arranged so as to project through the continuous wall portion of the gripping portion 16'c into the inside of same. The gripping portion 16'c is expansible or resiliently deformable for removale of the mounting bracket 14. This variant makes it possible to prevent the spring 42' from being exposed to viewers and is therefore desirable from the aesthetic point of view.

Figure 6:
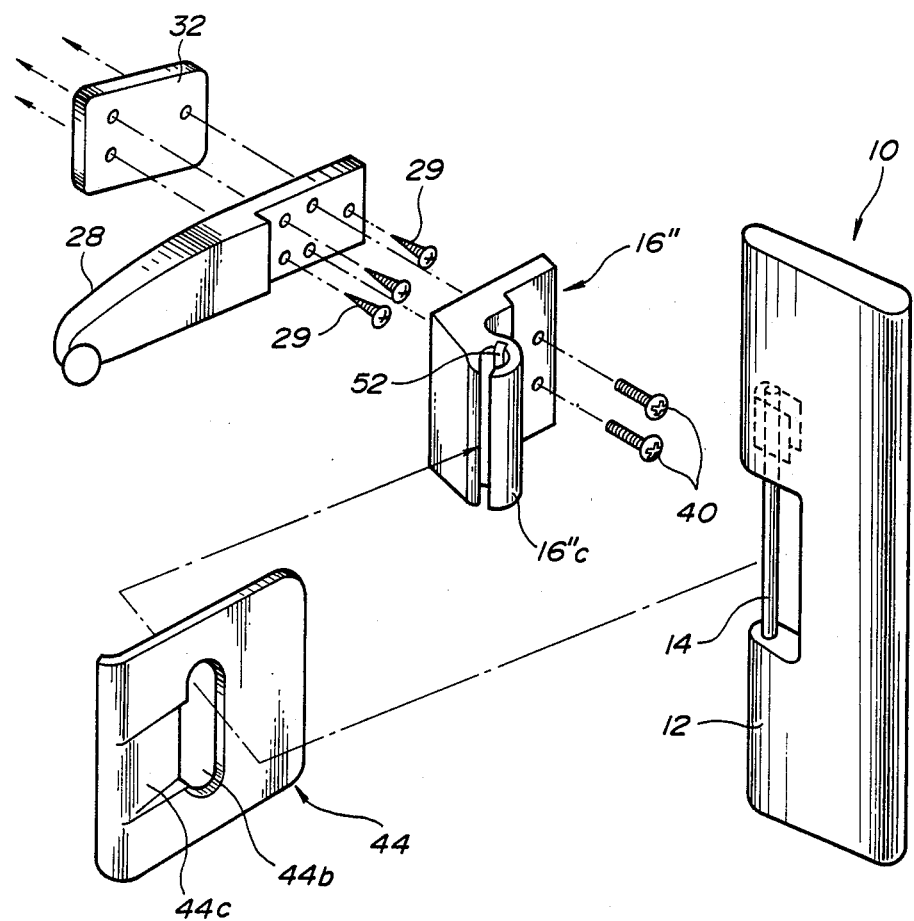
FIG. 6 is an exploded view of an auxiliary visor according to another embodiment of the present invention.
Figure 7:
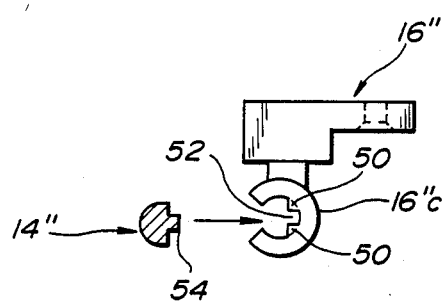
FIG. 7 is a side elevational, partly sectioned view of a mounting bracket and mounting shaft employed in the auxiliary visor of FIG. 6.

FIGS. 6 and 7 show another embodiment in which gripping portion 16"c of the mounting bracket 16" has on the part-cylindrical inner surface thereof a pair of projections 50 defining a recess 52 therebetween. On the other hand, the mounting shaft 14" is partly recessed to have a projection 54 fitingly engageable in the recess 52 when the shield 12 is in the position for storage. When a force larger than a predetermined value is applied to the sheild 12, the gripping portion 16"c expands a little to allow the projection 54 to go out of the recess 52, thus making the mounting shaft 14" and therefore the shield 12 rotatable.

Except for the above, this embodiment is substantially similar to the previous embodiment and can produce substantially the same effect.

What is claimed is:

1. An auxiliary visor for a vehicle having a pair of sun visors and a rear view mirror disposed between said pair of sun visors, said auxiliary visor comprising:
   a shield disposed between said sun visors;
   a mounting shaft fixedly installed on said shield, a portion of said mounting shaft being exposed;
   a mounting bracket installed on a mounting stay means of said rear view mirror, said mounting bracket having a gripping portion for supporting said mounting shaft; and
   said mounting bracket including means for holding said mounting shaft yieldingly fixed in a predetermined angular position relative to said mounting bracket.

2. An auxiliary visor according to claim 1, wherein said holding means comprises a flat surface portion formed in said mounting shaft, and a leaf spring installed on said mounting bracket and having a u-shaped end portion which projects into said gripping portion for surface-to-surface contact with said flat surface of said mounting shaft.

3. An auxiliary visor according to claim 2, wherein said leaf spring is resiliently deformable to remove said mounting shaft from said gripping portion.

4. An auxiliary visor according to claim 2, wherein said gripping portion of said mounting bracket is resiliently deformable to remove said mounting shaft from said gripping portion.

5. An auxiliary visor according to claim 2, wherein said mounting bracket is of an L-like cross section and has a first arm extending along a front roof rail and a second arm extending away from said first arm to have at a free end thereof said gripping portion, said spring being of an L-like cross section and having a first spring arm extending along and secured to said first arm of said mounting bracket and a second spring arm extending away from said first arm of said spring to have at a free end thereof said U-shaped end portion.

6. An auxiliary visor according to claim 5, wherein a portion of said shield is recessed in such a way as to have said recess between opposite upper end portions thereof, said exposed portion of said mounting shaft being exposed at said recess.

7. Auxiliary visor according to claim 1, wherein said mounting shaft includes a projection, said gripping portion having a recess in which said projections is fittingly engageable, said holding means comprising said projection and said recess.

8. An auxiliary visor according to claim 1, wherein said vehicle has a front roof rail, said rear view mirror having a mirror main body and said stay supporting said mirror main body on said front roof rail, said stay having an anchor portion secured to said front roof rail, said mounting bracket being secured to said anchor portion of said stay.

* * * * *